US006665452B1

United States Patent
Takemoto et al.

(10) Patent No.: US 6,665,452 B1
(45) Date of Patent: Dec. 16, 2003

(54) CORRECTION CONVERSION CIRCUIT FOR CONVERTING TO IMAGE DATA SKEW OF WHICH IS CORRECTED AND SKEW QUANTITY CORRECTION METHOD

(75) Inventors: Hitoshi Takemoto, Niigata (JP); Hiromasa Kanno, Niigata (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/436,005

(22) Filed: Nov. 9, 1999

(30) Foreign Application Priority Data

Nov. 13, 1998 (JP) ............................. 10-323502

(51) Int. Cl.$^7$ .............................. G06K 9/62; G06K 9/36; G06K 9/32; H04N 1/04
(52) U.S. Cl. ..................... 382/289; 382/216; 382/218; 382/291; 382/296; 358/486; 358/488; 358/496
(58) Field of Search ................. 382/286, 287, 382/289, 291, 293, 295, 296, 297, 305, 149, 151, 165, 170, 171, 190, 215, 216, 217, 218, 219, 278, 309; 358/449, 488, 1.5, 489, 496, 497; 345/648, 649; 356/614, 622; 702/150, 151, 152, 153

(56) References Cited

U.S. PATENT DOCUMENTS

| 4,941,189 A | * | 7/1990 | Britt ........................... 382/296 |
| 5,676,477 A | * | 10/1997 | Tanaka et al. .............. 400/579 |
| 6,097,855 A | * | 8/2000 | Levien ....................... 382/296 |

FOREIGN PATENT DOCUMENTS

| JP | 1-198172 | 8/1989 |
| JP | 8-90837 | 4/1996 |

* cited by examiner

*Primary Examiner*—Bhavesh M. Mehta
*Assistant Examiner*—Yosef Kassa
(74) *Attorney, Agent, or Firm*—Dickstein, Sharipo, Morin & Oshinsky, LLP.

(57) ABSTRACT

According to an image data correction conversion circuit and a skew quantity correction method respectively according to the present invention, image data for predetermined lines is stored, the quantity of skew of the stored image data is measured, the number of blocks into which the image data is divided is operated based upon the quantity of the skew and a control signal for correcting and converting the image data based upon the operated data is output. A selector acquires image data the quantity of skew of which is corrected by selecting and outputting the stored image data for predetermined lines according to the control signal.

9 Claims, 4 Drawing Sheets

CORRECTION CONVERSION CIRCUIT FOR CONVERTING TO IMAGE DATA SKEW OF WHICH IS CORRECTED AND SKEW QUANTITY CORRECTION METHOD

BACKGROUND OF THE INVENTION

1. Field of the Invention

The present invention relates to an image data correction conversion circuit for correcting skew caused when a photoconductor is exposed to laser beams in an electrophotographic printer and a skew quantity correction method.

2. Description of the Related Art

Heretofore, in a printer using electrophotography, a photoconductor is exposed based upon image data and a latent image is formed. For exposure, a laser unit that irradiates a laser beam is often used. The above laser unit is acquired by integrating a laser and an optical system composed of a lens for focusing a laser beam from the laser and a polygon mirror.

Figure 5:
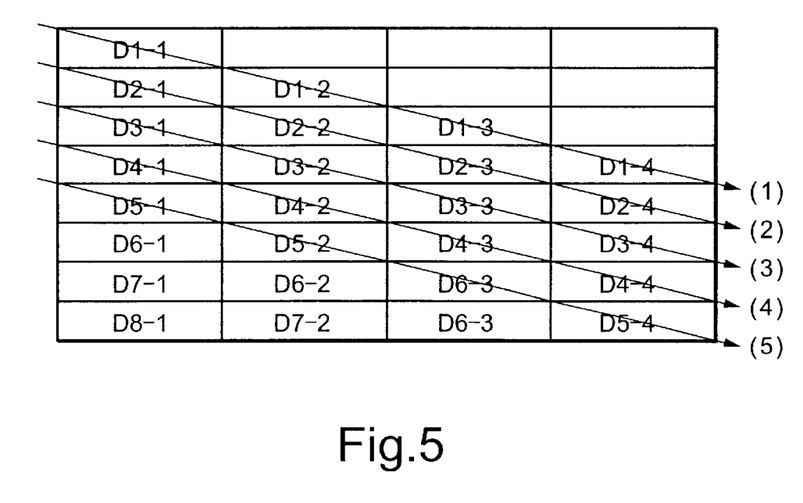
FIG. 5 is a conceptual drawing for explaining the occurrence of skew quantity in conventional type image formation.

The above laser unit is required to be installed without tilting for a photoconductor. For example, if the laser unit is installed right-handed downward in a horizontal scanning direction, the result of output shown in FIG. 5 is acquired. In FIG. 5, an arrow shows a direction in which image data is output and assuming that a right-hand upward direction is a positive direction and a right-hand downward direction is a negative direction, image data is output on printing paper with the image data skewed by '−3' in FIG. 5. The above quantity of skew of '−3' means that image data is skewed in a right-hand downward direction in a vertical scanning direction by 3 pixels in one scanning.

Referring to FIG. 5, an example of conventional type operation will be described below.

FIG. 5 shows the result of output in case an image data correction conversion circuit according to the present invention is not used. FIG. 5 shows a case that a laser unit is installed right-handed downward in a horizontal scanning direction of a photoconductor and the arrow shows a direction in which image data is output. Assuming that a right-hand upward direction is a positive direction and a right-hand downward direction is a negative direction, FIG. 5 shows that image data is output on printing paper with the image data skewed by '−3'. If printing paper is divided into four blocks in a horizontal scanning direction and the blocks in which a first line (a line No. (1)) of image data is output are respectively D1-1, D1-2, D1-3 and D1-4, image data is sequentially printed right-handed downward with the image data skewed by '−3' as shown in FIG. 5. Afterward similarly, a line (2), a line (3), a line (4) and a line (5) are printed right-handed downward on printing paper.

However, in the above example of the conventional type, the larger the quantity of skew is, the worse the quality of printing of an output result becomes. Therefore, it can be said that the degree of skew has an effect upon the performance of a printer. Also, when a laser unit is installed, it is required to be precisely assembled to reduce the quantity of skew. Therefore, a problem that the manhour of the assembly is remarkably increased, a fixture and others are required to be produced and the price of a printer rises occurs.

SUMMARY OF THE INVENTION

The object of the present invention is to provide an image data correction conversion circuit for enabling the correction of skew as if the correction of skew was executed according to a program and a skew quantity correction method.

To achieve the above object, an image data correction conversion circuit disclosed in claim 1 is composed of a line buffer which can store image data for predetermined lines, CPU for measuring the quantity of skew of the image data stored in the line buffer and operating the number of blocks which divide the image data based upon the quantity of the skew, a control circuit for outputting a control signal to correct and convert the image data based upon data operated by CPU and a selector for selecting and outputting image data input to the line buffer and corrected by the quantity of the skew according to the control signal.

The above selector, control circuit and line buffer may be also integrated in a gate array.

The quantity of skew is measured when an image formation device in which the above image data correction conversion circuit is mounted such as a copying machine is powered on or if necessary. The control circuit may be also provided with a register for comparison for storing a counted dot clock value which functions as a measure to recognize a position every block operated by CPU in a horizontal scanning direction.

In this case, image data is sequentially stored in the above line buffer in synchronization with a dot clock generated corresponding to the image data. Image data input to the line buffer is defined corresponding to a counted dot clock value in an arbitrary position in a horizontal scanning direction. CPU operates the number of blocks which divide image data based upon the quantity of skew corresponding to a counted dot clock value and the operated counted dot clock value is stored in the register for comparison. The selector selects image data based upon the result of comparison between the counted dot clock value stored in the register for comparison and an actual counted dot clock value of image data.

Further, a controller for once storing image data before the image data is input to the line buffer and outputting the image data in synchronization with a dot clock may be also provided and a correction circuit may be also added to the gate array.

Also, it is desirable that the control circuit is provided with a line buffer control circuit for controlling the output of image data from the line buffer.

It is desirable that the above line buffer control circuit is provided with a comparator circuit for comparing a counted dot clock value stored in the register for comparison beforehand and a dot clock and a multiplexer control circuit for determining which block on which line of image data every line read from the line buffer is selected based upon the result of the comparison output from the comparator circuit and outputting the above image data switching the image data every block.

A skew quantity correction method according to the present invention is characterized in that image data for predetermined lines is stored, the quantity of skew of the stored image data is measured, the number of blocks which divide the image data is operated based upon the measured quantity of skew, the above quantity of skew is corrected based upon the operated data, the stored image data is selected and output.

DETAILED DESCRIPTION OF THE PREFERRED EMBODIMENTS

Figure 1:
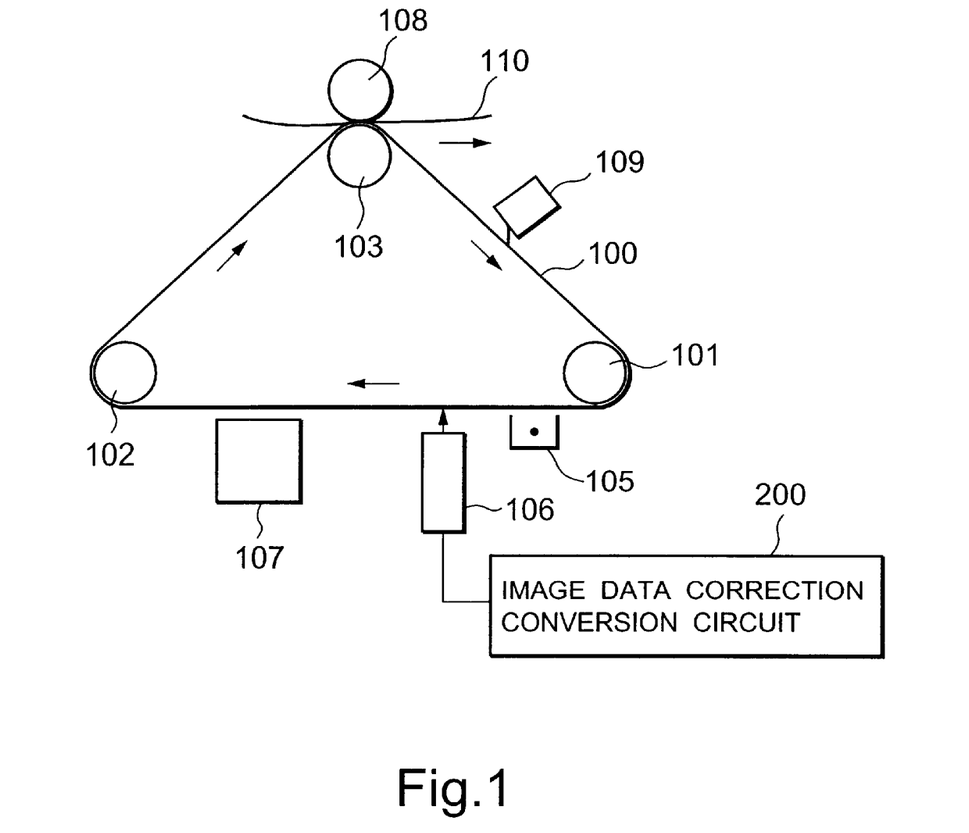
FIG. 1 is a diagram showing an example of an image forming apparatus using an image data correction conversion circuit according to the present invention

Next, referring to the attached drawings, an embodiment of an image data correction conversion circuit and a skew quantity correction method respectively according to the present invention will be described in detail. FIG. 1 shows an example of an image forming apparatus using an image data correction conversion circuit according to the present invention, and FIG. 2 shows an embodiment of the image data correction conversion circuit shown in FIG. 1.

In FIG. 1, the image forming apparatus is a electrophotographic printer, which has a photoconductor belt 100. The photoconductor belt 100 is rotated by rollers 101, 102 and 103. An electric charger 105 charges the photoconductor belt 100 to an predetermined charging level. An exposing laser unit 106 exposes the photoconductor belt 100 for forming a latent image. The exposing laser unit 106 is connected to the image data correction conversion circuit 200 of the embodiment according to the present invention. A developer 107 forms a toner image on the photoconductor belt 100 according to the latent image. A transfer roller 108 transfers the toner image to a recording medium 110. A cleaning device 109 cleans the surface of the photoconductor belt 100 for eliminating a remaining toner on the photoconductor belt 100.

Figure 2:
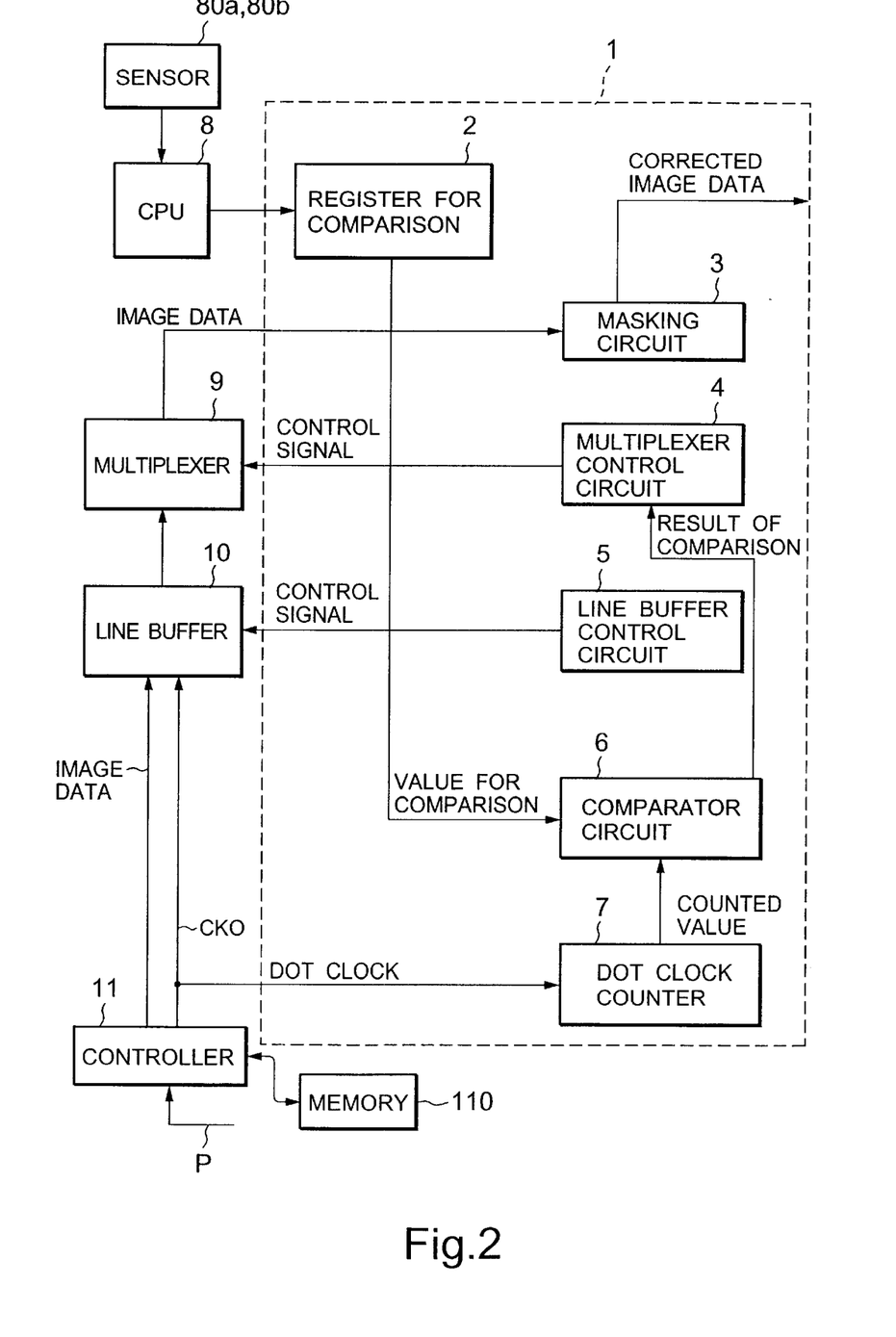
FIG. 2 is a block diagram showing an embodiment of the image data correction conversion circuit according to the present invention.

As shown in FIG. 2, the image data correction conversion circuit 200 is composed of a gate array 1, a line buffer 10 which can store image data equivalent to a few lines, a multiplexer 9 for selecting and outputting image data read from the line buffer 10 and a control circuit (CPU) 8 for controlling the above line buffer and multiplexer.

The number of lines of image data stored in the line buffer 10 is determined according to the skew corrected quantity. For example, if the laser beam on the photoconductor 100 is skewed in a right-hand upward or downward direction in one scanning and as a result, and the laser beam is skewed by M pieces of pixels (M: a positive number) in the vertical direction of the laser beam scanning direction, image data for M or more lines are stored to correct the skew.

The gate array 1 is composed of a register for comparison 2, a masking circuit 3, a multiplexer control circuit 4, a line buffer control circuit 5, a comparator circuit 6 and a dot clock counter 7 and the respective circuits are integrated. The multiplexer 9 and the line buffer 10 are arranged in the periphery of the gate array 1, respectively receive a control signal from the gate array 1 and image data is corrected and converted.

The image data correction conversion circuit shown in FIG. 1 and the skew quantity correction method are one example of the configuration given for explaining this embodiment. Also, the multiplexer 9 and the line buffer 10 can be also integrated in the gate array 1, in that case, the area of the above image data correction conversion circuit can be reduced and the method is effective to miniaturize the image formation device.

Next, how the image data correction conversion circuit and the skew quantity correction method according to the present invention function will be described. First, Sensors 80a and 80b detects a skew and CPU 8 measures the quantity and direction of the skew showing how large a horizontal scanning direction of the exposing laser unit 106 (FIG. 1) is declined from a reference horizontal direction. The measurement is initiated according to a signal showing an instruction from a control panel not shown or when the device is powered on.

Figure 3A:
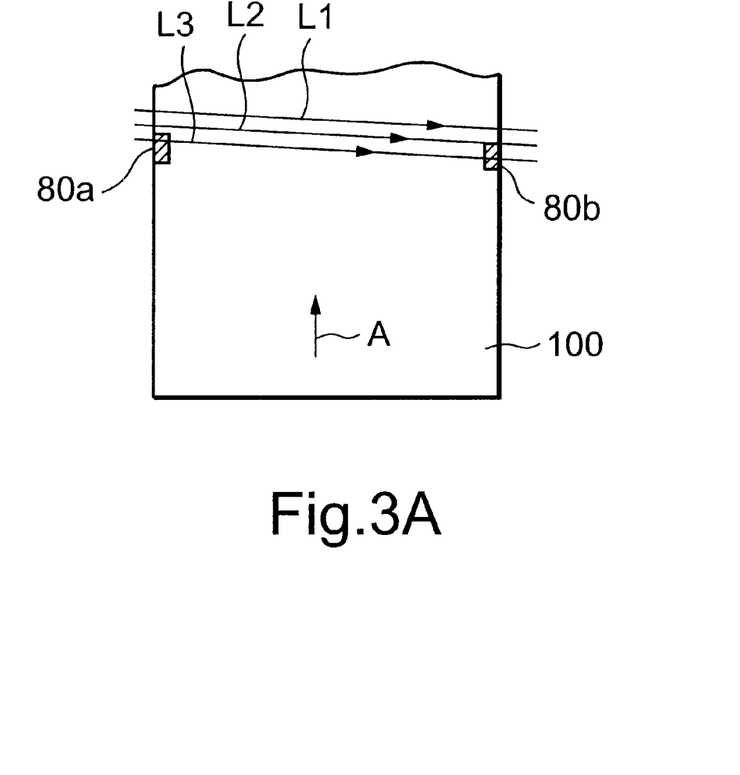
FIGS. 3A and 3B are diagrams showing the skew detection of the embodiment.
Figure 3B:
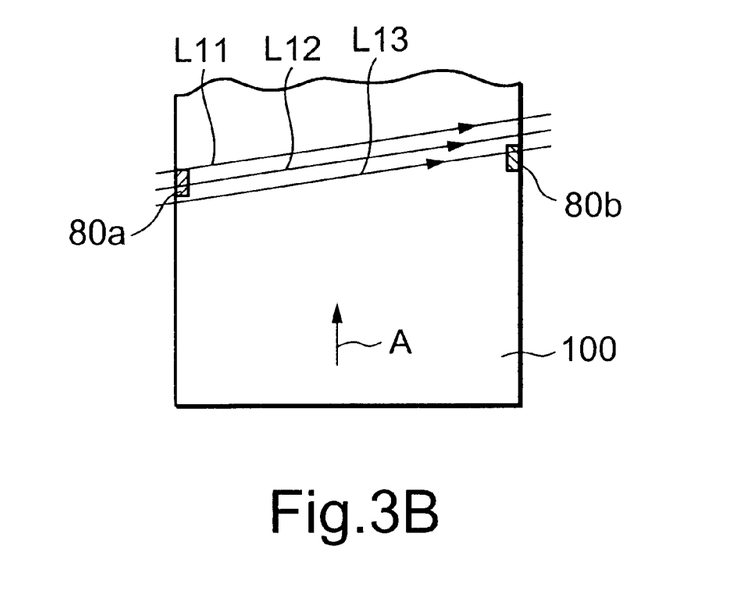

FIGS. 3A and 3B show skew detections by the sensors 80a and 80b. The sensor 80a and 80b are located at the edges of the photocnductor belt 100 and on the reference horizontal scanning line. First, the exposing laser unit 106 scans the laser beam on the sensor 80a and 80b. If horizontal scanning directions of the scanning laser beam is identical with the reference horizontal scanning direction, the sensors 80a and 80b detects the laser beam at the same time; however, if the skew is generated, one of the sensors 80a and 80b does not detected the laser beam.

In FIG. 3A, lines L1, L2, L3 are tracks of first, second, and third laser beams, and the photoconductor belt 100 moves along the allow A. The first laser beam is detected by the sensor 80b, but not detected by the sensor 80a. The second laser beam is also not detected by the sensor 80a. The third laser beam L3 is at last detected by the sensors 8a. In FIG. 3B, lines L11, L12, L13 are tracks of first, second, and third laser beams, and the photoconductor belt 100 moves along the allow A. The first laser beam is detected by the sensor 80a, but not detected by the sensor 80b. The second laser beam is also not detected by the sensor 80b. The third laser beam L3 is at last detected by the sensors 8b. There fore, the quantity of the skew is "2" (that is: the laser beam skews "2" dots in the vertical direction of the laser scanning direction) and the skew directions of FIG. 3A and FIG. 3B are different (In FIG. 3A, the laser beam skews in the direction of right-handed downward, and in FIG. 3B, the laser beam skews in the direction of right-handed upward).

The CPU 8 measures the quantity and direction of the skew from the output of the sensors 80a and 80b. The quantity of the skew represents how many pixels is dislocated in a vertical scanning direction in one scanning beam. In this case, the CPU 8 simultaneously detects the skew direction representing whether a laser beam is dislocated right-handed upward as shown in FIG. 3B or right-handed downward as shown in FIG. 3A. The CPU 8 outputs the data of the direction of the skew to the multiplexer control circuit 4.

The CPU 8 also operates into how many blocks image data stored in the line buffer 10 is to be divided based upon the quantity of the skew and instructs the register 2 to store reference dot clock values functioning as a measure to recognize the position of each block in a horizontal scanning direction. Division may be also even or uneven. For example, if the laser beam on the photoconductor belt 100 is skewed in a right-hand upward or downward direction in one scanning and as a result, and the laser beam is skewed by M pieces of pixels (M: a positive number) in the vertical direction of the laser scanning direction, the image data of each line are divided to M+1 blocks. In this case, the CPU 8 generates M+1 reference dot clock count values before dividing.

In this embodiment, image data is divided into four blocks every N dots (N pixels) in a horizontal scanning direction and the register has a start register for storing start position and 2ND-COMP, 3RD-COMP, 4TH-COMP and END registers for storing the reference dot clock counter values.

After power on or the quantity of the skew is measured if necessary, image data is written to the register for comparison 2.

Next, after image data sent from a host not shown is once stored in the memory 110 of a controller 11, processing such as image processing is applied to the image data according to an instruction from the host. Then the image data synchronized with a dot clock is output to the line buffer 10 together with the dot clock CK0. The line buffer 10 sequentially buffers image data according to a control signal from the line buffer control circuit 5 in the gate array 1. At this time, the dot clock counter 7 counts the dot clock CK0 and outputs the result to the comparator circuit 6.

The comparator circuit 6 always compares a counted dot clock value and the counted value stored in the register for comparison 2 beforehand and outputs the result to the multiplexer control circuit 4 when the value in the register for comparison 2 and the counted dot clock value are identical with each other.

The multiplexer control circuit 4 determines which image data block on which line of image data every line read from the line buffer 10 is selected based upon the result of the comparison output from the comparator circuit 6 and the data of the skew direction from CPU 8 and outputs the selected image data block to the masking circuit 3, switching image data every block. The masking circuit 3 masks the outside of the area of printing paper of corrected image data and outputs the data to the exposing laser unit 106 in FIG. 1.

Figure 4:
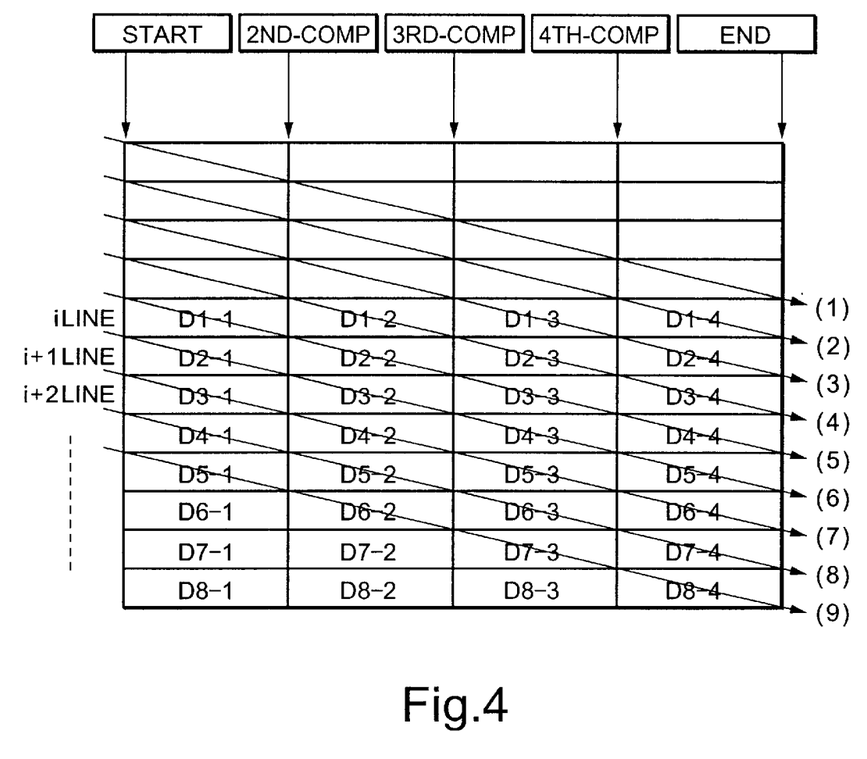
FIG. 4 is a conceptual drawing for explaining an example of a processing procedure of a skew quantity correction method in image formation.

FIG. 4 shows an embodiment of the operation according to the present invention. Referring to FIG. 4, an example of the operation equivalent to this embodiment will be described in detail below.

Line Nos. (1), (2), (3), (4), - - - shown in FIG. 4 show a line scanned by a laser beam and the timing is equal to that of line Nos. (1), (2), (3), (4), - - - shown in FIG. 3. Line numbers (i, i+1, i+2, - - - ) shown on the left side of FIG. 2 are those of a recorded image data line after the skew is corrected.

As shown in FIG. 4, each line stored in the line buffer 10 is read, its image data block is selected by the multiplexer 9, and the image data block of the next line is also similarly selected so that the quantity of skew of '−3' is corrected. A skew direction is a right-hand downward direction. The procedure of control executed on each line will be described every line in detail below.

Before generating the image data of the line No. (2), image data block D1-1 to D1-4 (the term "image data block" will be omitted hereinafter) have already been written in the line buffer 10.

1: To generate the image data of line No. (2), the following procedure is performed.

D2-1 to D2-4 are written to the line buffer 10 from the controller 11, and at the same time, a dot clock CK0 is counted by the dot clock counter 7.

When the counted value becomes equal to a counted value stored in 4TH-COMP register of the register 2, the multiplexer 9 selects D1-4 from the stored image data block D1-1 to D1-4 and D2-1 to D2-4 and output the D1-4.

When a counted value stored in END register in the register 2 and the counted dot clock value are equal, the output of the D1-4 is terminated.

Then the masking circuit 3 masks the outside of the area of printing paper.

2: To generate the image data of the line No. (3), the following procedure is performed.

D3-1 to D3-4 are written to the line buffer 10, and at the same time, the dot clock CK0 is counted by the dot clock counter 7.

When the counted value becomes equal to a counted value stored in 3RD-COMP register of the register 2, the multiplexer 9 selects D1-3 from the stored image data and outputs the D1-3.

When the counted value becomes equal to the counted value stored in the 4TH-COMP register, the multiplexer 9 selects and outputs D2-4.

When the counted value stored in the END register of the register 2 and a counted dot clock value become equal to each other, the output of the D2-4 is terminated.

Then the masking circuit 3 masks the outside of the area of printing paper.

3: To generate the image data of line No. (4), the following procedure is performed.

D4-1 to D4-4 are written to the line buffer 10, and at the same time, a dot clock CK0 is counted by the dot clock counter 7.

When the counted value becomes equal to a counted value stored in 2ND-COMP register of the register 2, the multiplexer 9 selects and outputs D1-2.

When the counted value becomes equal to the counted value stored in the 3RD-COMP register, the multiplexer 9 selects and outputs D2-3.

When the counted value becomes equal to the counted value stored in the 4TH-COMP register, the multiplexer 9 selects and outputs D3-4.

When the counted value stored in the END register and a counted dot clock value are equal, the output of D3-4 is terminated.

Then the masking circuit 3 masks the outside of the area of printing paper.

4: To generate the image data of line (5), the following procedure is performed.

D5-1 to D5-4 are written to the line buffer 10, and at the same time, a dot clock is counted by the dot clock counter 7.

When the counted value becomes equal to a counted value stored in START register of the comparator circuit 6, the multiplexer 9 selects and outputs D-1.

When the counted value becomes equal to the counted value stored in the 2ND-COMP register of the register 2, the multiplexer 9 selects and outputs D2-2.

When the counted value becomes equal to the counted value stored in the 3RD-COMP register, the multiplexer 9 selects and outputs D3-3.

When the counted value becomes equal to the counted value stored in the 4TH-COMP register, the multiplexer 9 selects and outputs D4-4.

When the counted value stored in the END register and a counted dot clock value are equal, the output of D4-4 is terminated.

Then the masking circuit 3 masks the outside of the area of printing paper.

5: To generate the image data of line No. (6), the following procedure is performed.

D6-1 to D6-4 are written to the line buffer 10 and the D1-1 to D1-4 are deleted, and, at the same time, the dot clock CK0 is counted by the dot clock counter 7.

When the counted value becomes equal to the counted value stored in the START register, the multiplexer 9 selects and outputs D2-1.

When the counted value becomes equal to the counted value stored in the 2ND-COMP register, the multiplexer 9 selects and outputs D3-2.

When the counted value becomes equal to the counted value stored in the 3RD-COMP register, the multiplexer 9 selects and outputs D4-3.

When the counted value is equal to the counted value stored in the 4TH-COMP register, the multiplexer 9 selects and outputs D5-4. When the counted value stored in the END register and a counted dot clock value are equal, the output of D5-4 is terminated.

Then the masking circuit 3 masks the outside of the area of printing paper.

6: To generate the image data of the line No. (7), the following procedure is performed.

D7-1 to D7-4 are written to the line buffer 10 and the D2-1 to D2-4 are deleted, and, at the same time, a dot clock is counted by the dot clock counter 7.

When the counted value becomes equal to the counted value stored in the START register, the multiplexer 9 selects and outputs D3-1.

When the counted value becomes equal to the counted value stored in the 2ND-COMP register, the multiplexer 9 selects and outputs D4-2.

When the counted value becomes equal to the counted value stored in the 3RD-COMP register, the multiplexer 9 selects and outputs D5-3.

When the counted value becomes equal to the counted value stored in the 4TH-COMP register, the multiplexer 9 selects and outputs D6-4.

When the counted value stored in the END register and a counted dot clock value are equal, the output of D6-4 is terminated.

Then the masking circuit 3 masks the outside of the area of printing paper.

7: To generate the image data of the line No. (8), the following procedure is performed.

D8-1 to D8-4 are written to the line buffer 10 and the D3-1 to D3-4 are deleted, and at the same time, a dot clock is counted by the dot clock counter 7.

When the counted value becomes equal to the counted value stored in START register, the multiplexer 9 selects and outputs D4-1.

When the counted value becomes equal to the counted value stored in the 2ND-COMP register, the multiplexer 9 selects and outputs D5-2.

When the counted value becomes equal to the counted value stored in the 3RD-COMP register, the multiplexer 9 selects and outputs D6-3.

When the counted value is equal to the counted value stored in the 4TH-COMP register, the multiplexer 9 selects and outputs D7-4.

When the counted value stored in the END register and a counted dot clock value are equal, the output of D7-4 is terminated.

Then the masking circuit 3 masks the outside of the area of printing paper.

8: To geterate the image data of the line (9), the following procedure is performed.

D9-1 to D9-4 are written to the line buffer 10 and the D4-1 to D4-4 are deleted, and, at the same time, a dot clock is counted by the dot clock counter 7.

When the counted value becomes equal to the counted value stored in START register, the multiplexer 9 selects and outputs D5-1.

When the counted value becomes equal to the counted value stored in the 2ND-COMP register, the multiplexer 9 selects and outputs D6-2.

When the counted value becomes equal to the counted value stored in the 3RD-COMP register, the multiplexer 9 selects and outputs D7-3.

When the counted value becomes equal to the counted value stored in the 4TH-COMP register, the multiplexer 9 selects and outputs D8-4.

When the counted value stored in the END register and a counted dot clock value are equal, the output of D8-4 is terminated.

Then the masking circuit 3 masks the outside of the area of printing paper.

Afterward, skew shown in FIG. 4 is corrected by executing the similar control, image data which is not tilted in a horizontal scanning direction can be formed and output.

In the present invention, as image data for a few lines is stored in the line buffer, a printing start line is dislocated by the quantity, compared with a regular start line. FIG. 4 shows that dislocation equivalent to four lines is caused. For a method of correction, if the quantity of skew is '−3', the above problem can be solved by actually writing on printing paper earlier by four lines from the regular line. That is, if the regular line is written on the "A"th line from the end of the printing paper, a correction method according to the present invention has only to be controlled so that data is written on the (A-4)th line. Similarly, if the configuration according to the present invention is used, data is written earlier by three lines in case the quantity of skew is '−2' and data is written earlier by eleven lines in case the quantity of skew is '+10'.

According to the image data correction conversion circuit and the skew quantity correction method respectively equivalent to the above embodiment, even if skew is caused in a horizontal scanning direction by the image data recording head, the tilt of image data is corrected and printing of high quality can be output. As the image data recording head is not required to be installed so precisely as in a conventional type, the above circuit and method are also effective to reduce manhour when the device is assembled.

In Japanese published unexamined patent application No. Hei 8-90837 (published on Apr. 9, 1996) and Japanese published unexamined patent application No. Hei 1-198172 (published on Aug. 9, 1989), a method of correcting skew caused by a recording head installed with it tilted in a horizontal scanning direction and printing is disclosed.

However, the inventions disclosed in the above two patent applications are made to correct skew caused in recording by a thermal head of an image recording device using a line head (the thermal head) as a recording head. As skew to be corrected is caused in recording by the thermal head, recording data can be divided every a few blocks in a horizontal scanning direction and can be controlled. Therefore, image data can be corrected and controlled by providing a delay circuit and others and delaying printing timing independent of another divided part.

However, in the case of a copying machine using a laser beam as recording means, as recording data cannot be divided in a horizontal scanning direction as in the technique disclosed in the above patent applications, skew cannot be corrected by a delay circuit.

Therefore, in the present invention, after image data is once stored in a memory, it is divided and corrected.

As the capacity of a memory for correction is limited except an exception that a page memory which can store image data for one page is used, it is important to vary a divided block according to the quantity of skew to effectively utilize the above memory, if corrected image data is not divided into the optimum number of blocks, image data is uselessly switched and as a result of printing, difference in a level between dots stands out.

As for the above number of blocks, in the present invention, the number of divided blocks is varied according to the quantity of skew, while in the invention disclosed in the Japanese published unexamined patent application No. Hei 8-90837, image data is equally divided into 10 blocks beforehand.

Further, in the Japanese published unexamined patent application No. Hei 8-90837, a line head is used for a recording head and printing is performed every line, however, it is not described how image data read from a frame memory behind is set in a shift register for the line head and is printed.

In the invention disclosed in Japanese published unexamined patent application No. Hei 1-198172, image data is also corrected using a delay circuit in place of a memory. However, if image data can be corrected only within one line and therefore, the quantity of skew exceeds one line, image data cannot be corrected. Further, there is a problem that if the resolution of a line head is enhanced and a printing frequency is accelerated, a range in which skew can be corrected is also reduced.

The above embodiment is an example of suitable embodiments of the present invention. However, the present invention is not limited to the embodiment and the present invention can be varied in a range in which variations do not deviate from the object of the present invention.

In the above embodiment, the example of the laser unit in the image data recording device is given, however, an image data recording device for forming an latent image on a photoconductor is not like the above example and the present invention can be also applied to an LED method for outputting image data using LED and a liquid crystal shutter method for outputting image data using a liquid crystal shutter.

The multiplexer 9 is used for a selector for selecting image data the skew of which is corrected, however, a reading control circuit for controlling reading from the line buffer 10 in place of the multiplexer may be also used. In this case, a control signal is generated based upon the result of comparison sent from the comparator circuit 6 and the reading control circuit selects image data the skew of which is corrected according to the control signal.

As clear from the above description, in the image data correction conversion circuit and the skew quantity correction method respectively according to the present invention, image data for predetermined lines is stored, the quantity of skew of the stored image data is measured, the number of blocks into which the image data is divided is operated based upon the quantity of the skew and a control signal for correcting and converting the image data based upon the operated data is output. The selector acquires image data the quantity of skew of which is corrected by selecting and outputting the stored image data for the predetermined lines according to the control signal.

Hereby, the quantity of skew caused in the image formation device such as a copying machine during image formation can be corrected. As the quantity of skew can be corrected according to a procedure like according to a program, the correction of skew in the image formation device is facilitated and the manufacturing process of the image formation device can be simplified.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. An image data correction conversion circuit, comprising:
   line buffer which stores image data for predetermined lines;
   CPU measuring a quantity of skew of the image data stored in said line buffer, dividing the image data into a plurality of blocks based on the quantity of skew, and generating data for correcting skew of said image data in said line buffer based upon the quantity of the skew;
   a control circuit for generating a control signal based upon said data generated by said CPU; and
   a selector, responsive to said control signal, for selecting image data from said line buffer to correct the skew of said image data and outputting corrected image data of a horizontal scanning direction.

2. The image data correction conversion circuit according to claim 1, wherein said CPU generates reference dot clock values for recognizing positions of the divided blocks of image data in a horizontal scanning direction.

3. The image data correction conversion circuit according to claim 2, wherein:
   said image data is sequentially stored in said line buffer in synchronization with a dot clock generated corresponding to said image data.

4. The image data correction conversion circuit according to claim 3, said control circuit further comprising:
   a register storing said reference dot clock values generated by said CPU;
   a counter circuit counting said dot clock; and
   a control signal generating circuit generating said control signal based upon the result of comparison between said reference dot clock values from said register and a counted value from said counter circuit.

5. The image data correction conversion circuit 5 according to claim 4, wherein:
   said selector is a multiplexer for selecting image data from said line buffer; and
   said control signal generating circuit is provided with a comparator circuit comparing said reference dot clock values from said register and a counted value from said counter circuit, and a multiplexer control circuit controlling said multiplexer based upon the result of comparison output from said comparator circuit, determining which block on which line of image data every line read from said line buffer is selected, and outputting said image data switching said image data every block.

6. The image data correction conversion circuit according to claim 3, further comprising a controller storing image data before it is stored in said line buffer and outputting said image data in synchronization with said dot clock.

7. The image data correction conversion circuit according to claim 1, wherein said selector, said line buffer and said control circuit are integrated in a gate array.

8. The image data correction conversion circuit according to claim 1, wherein said CPU measures the quantity of skew when an image formation device in which said image data correction conversion circuit is mounted is powered on or according to an instruction signal.

9. A skew quantity correction method, comprising:
   storing image data for predetermined lines,
   measuring a quantity of skew of said stored image data,
   dividing said image data in a number of blocks based upon said measured quantity of skew; and
   selecting and outputing said stored image data, the quantity of skew of which is corrected, based upon said divided blocks of image data.

* * * * *